Feb. 6, 1962 C. VONK 3,020,345
AMPLIFYING ARRANGEMENT FOR STEREOPHONIC REPRODUCTION
Filed Nov. 16, 1959
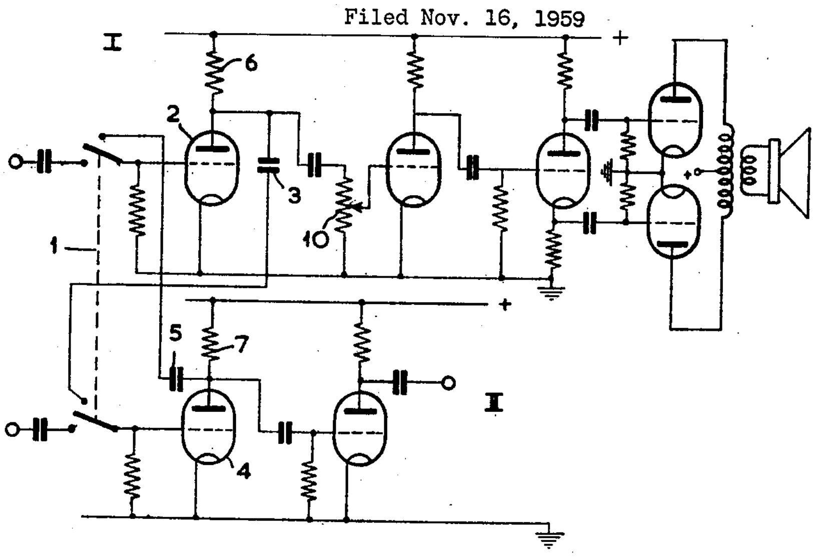
INVENTOR
cornelis vonk
BY Frank R. Jifari
AGENT United States Patent Office 3,020,345

Patented Feb. 6, 1962

3,020,345

AMPLIFYING ARRANGEMENT FOR STEREOPHONIC REPRODUCTION

Cornelis Vonk, The Hague, Netherlands, assignor to North American Philips Company, Inc., New York, N.Y., a corporation of Delaware Filed Nov. 16, 1959, Ser. No. 853,303
Claims priority, application Germany Nov. 24, 1958
2 Claims. (Cl. 179—1)

The invention relates to an amplifying arrangement for stereophonic reproduction, comprising two amplifying channels, of which one includes an electro-acoustic converter (for example a loudspeaker), whereas the other includes preferably only one preamplifier, of which the output is to be connected to a reproducing apparatus. With such an amplifier there is the problem that the amplification factor of the two channels must be accurately the same, since the acoustic reproduction image fluctuates strongly with differences in sound intensity of the acoustic converters.

With reproduction of records it has been suggested to utilize a test record which is played by means of the two pick-ups connected in series with the two amplifying channels, so that the aurally correct position of the sound image can be obtained by readjustment of the amplification factor of the individual channels.

The invention provides a much simpler solution and is characterized in that the amplifiers of the arrangement can be interconnected by means of a switch to provide an oscillation producer, the oscillation produced being fed to the two channels, so that their electro-acoustic converters emit tones of different strengths in accordance with the difference in amplification in the two channels and in that provision is made of a control-member for the readjustment of the amplification factor in at least one of the channels to compensate the said difference.

The invention will be described more fully with reference to the drawing.

The FIGURE is a circuit diagram of a two channel amplifier according to one embodiment of the invention.

The figure illustrates a so-called "front end," by means of which a conventional amplifier of a record player or the low-frequency portion of a wireless set can be made suitable for sterophonic reproduction of records. The arrangement comprises two channels I and II, of which the first includes a complete amplifier and a loudspeaker, whereas the second channel includes only one preamplifier, of which the output voltage is fed to an existing reproducing device (radio receiver or amplifier of a record player).

The amplifying elements are preferably formed by multiple-grid valves; as an alternative, however, use may be made of transistors particularly, when the second channel comprises a complete amplifier and the two channels are provided with loudspeakers or headphones.

In order to obviate the difference between the sound reproductions of the two channels, provision is made of a double-pole switch 1 in the input, by means of which the anode of one input valve 2 is connected via a capacitor 3 to the grid of the other input valve 4 and the anode thereof is connected via a capacitor 5 to the grid of the first-mentioned valve 2. The valves 2, 4 and the capacitors 3, 5 operate, together with the existing anode resistors 6, 7, as a relaxation oscillator, by means of which a symmetrical, square-wave voltage with a frequency of, for example, 1000 c./s. is produced. This frequency and this waveform facilitate considerably the aurally correct adjustment of the sound image. The symmetrical waveform of the produced oscillation guarantees an identical signal supply for the inputs of the two channels. The readjustment of the amplification takes place by means of the control-member 10.

What is claimed is:

1. An amplifying system for stereophonic reproduction comprising first and second amplifier channels, said first channel having an electroacoustic converter connected to the output thereof, said second channel having an output circuit, means for connecting said output circuit to a reproducing apparatus, each of said channels having an amplifying device, switch means connected to said channels for selectively interconnecting the output of each amplifier device to the input of the other amplifier device and to remove signal inputs to said first and second channels, whereby electrical oscillations are simultaneously applied to both of said channels, and means for adjusting the amplification factor of at least one of said channels.

2. An amplification system for stereophonic reproduction comprising first and second amplifier channels each having an input terminal and an output terminal, means for connecting the output terminals of said channels to separate electroacoustic converter means, each of said channels comprising an amplifying device having an output electrode and an input electrode, switch means connected to said channels to selectively connect the output electrode of each of said devices to the input electrode of the other of said devices by way of capacitor means, and to remove signal input to said first and second channels, whereby symmetrical relaxation oscillations are produced in said channels, and means for adjusting the amplification factor of at least one of said channels.

References Cited in the file of this patent

UNITED STATES PATENTS 2,121,434 Klinedinst et al. ---------- June 21, 1938